(12) United States Patent
Pape et al.

(10) Patent No.: US 11,422,946 B2
(45) Date of Patent: Aug. 23, 2022

(54) TRANSLATION LOOKASIDE BUFFER STRIPING FOR EFFICIENT INVALIDATION OPERATIONS

(71) Applicant: Apple Inc., Cupertino, CA (US)

(72) Inventors: John D. Pape, Cedar Park, TX (US); Brian R. Mestan, Austin, TX (US); Peter G. Soderquist, Milford, MA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/008,457

(22) Filed: Aug. 31, 2020

(65) Prior Publication Data

US 2022/0066947 A1  Mar. 3, 2022

(51) Int. Cl.
  *G06F 12/10*  (2016.01)
  *G06F 12/1027*  (2016.01)

(52) U.S. Cl.
  CPC ...... *G06F 12/1027* (2013.01); *G06F 2212/68* (2013.01)

(58) Field of Classification Search
  CPC .................. G06F 12/1027; G06F 2212/68
  USPC .......................................... 711/207
  See application file for complete search history.

(56) References Cited

U.S. PATENT DOCUMENTS

| | | | |
|---|---|---|---|
| 5,491,806 A | 2/1996 | Horstmann et al. | |
| 5,905,998 A | 5/1999 | Ebrahim et al. | |
| 5,946,717 A | 8/1999 | Uchibori | |
| 6,026,461 A | 2/2000 | Baxter et al. | |
| 6,516,379 B1 | 2/2003 | Deshpande et al. | |
| 6,523,076 B1 | 2/2003 | Kruse | |
| 6,542,949 B1 | 4/2003 | Kruse | |
| 6,560,689 B1 | 5/2003 | Mathews et al. | |
| 7,079,485 B1 | 7/2006 | Lau et al. | |
| 7,149,829 B2 | 12/2006 | Weber et al. | |
| 7,430,650 B1 | 9/2008 | Ross | |

(Continued)

OTHER PUBLICATIONS

Shreedhar et al., "Efficient Fair Queueing Using Deficit Round Robin", IEEE/ACM Transactions on Networking, Jun. 1996, pp. 375-385, vol. 4, No. 3, IEEE Press.

(Continued)

*Primary Examiner* — Hua J Song
(74) *Attorney, Agent, or Firm* — Kowert Hood Munyon Rankin and Goetzel PC; Rory D. Rankin (57) ABSTRACT

Systems, apparatuses, and methods for implementing translation lookaside buffer (TLB) striping to enable efficient invalidation operations are described. TLB sizes are growing in width (more features in a given page table entry) and depth (to cover larger memory footprints). A striping scheme is proposed to enable an efficient and high performance method for performing TLB maintenance operations in the face of this growth. Accordingly, a TLB stores first attribute data in a striped manner across a plurality of arrays. The striped manner allows different entries to be searched simultaneously in response to receiving an invalidation request which identifies a particular attribute of a group to be invalidated. Upon receiving an invalidation request, the TLB generates a plurality of indices with an offset between each index and walks through the plurality of arrays by incrementing each index and simultaneously checking the first attribute data in corresponding entries.

20 Claims, 8 Drawing Sheets

(56) References Cited

U.S. PATENT DOCUMENTS

| | | |
|---|---|---|
| 7,461,190 B2 | 12/2008 | Subramanian et al. |
| 8,037,250 B1 | 10/2011 | Barreh et al. |
| 8,108,650 B2 | 1/2012 | Petolino, Jr. |
| 8,316,212 B2 | 11/2012 | Petolino, Jr. |
| 8,682,864 B1 | 3/2014 | Plevyak et al. |
| 9,852,084 B1 | 12/2017 | Soderquist et al. |
| 10,140,216 B2 | 11/2018 | Williams et al. |
| 10,552,339 B2 | 2/2020 | Basu et al. |
| 10,649,907 B2 | 5/2020 | Abhishek Raja |
| 10,671,762 B2 | 6/2020 | Gulati et al. |
| 10,725,928 B1 | 7/2020 | Mestan et al. |
| 2001/0010066 A1 | 7/2001 | Chin et al. |
| 2005/0268045 A1 | 12/2005 | Slegel et al. |
| 2007/0005932 A1 | 1/2007 | Covelli et al. |
| 2009/0216994 A1* | 8/2009 | Hsieh ................. G06F 12/1027 711/207 |
| 2010/0318762 A1 | 12/2010 | Malyugin et al. |
| 2014/0173216 A1 | 6/2014 | Jayasena et al. |
| 2014/0325167 A1 | 10/2014 | Siegel et al. |
| 2015/0100753 A1 | 4/2015 | Shen et al. |
| 2016/0140042 A1 | 5/2016 | Mukherjee |
| 2016/0283384 A1 | 9/2016 | Podaima et al. |
| 2016/0350225 A1 | 12/2016 | Podaima et al. |
| 2017/0286300 A1 | 10/2017 | Doshi et al. |
| 2018/0018280 A1 | 1/2018 | Bradbury et al. |
| 2018/0089094 A1* | 3/2018 | Clancy ................ G06F 12/0891 |
| 2019/0034349 A1* | 1/2019 | Mcavoy .............. G06F 12/0891 |
| 2019/0155747 A1 | 5/2019 | Sandberg et al. |

OTHER PUBLICATIONS

Chidambaram Nachiappan, et al., U.S. Appl. No. 16/786,581, entitled "Configurable Packet Arbitration With Minimum Progress Guarantees", filed Feb. 10, 2020, 38 pages.

Non-Final Office Action in U.S. Appl. No. 16/786,581, dated Jul. 24, 2020, 13 pages.

* cited by examiner

TRANSLATION LOOKASIDE BUFFER STRIPING FOR EFFICIENT INVALIDATION OPERATIONS

BACKGROUND

Technical Field

Embodiments described herein relate to the field of computing systems and, more particularly, to efficiently invalidating translation lookaside buffer entries.

Description of the Related Art

Generally speaking, a variety of computing systems include one or more processors and one or more memory devices, and the processor(s) generate access requests for instructions and application data while processing software applications. The processors include a central processing unit (CPU), data parallel processors like graphics processing units (GPUs), digital signal processors (DSPs), multimedia engines, and so forth. Each of the processors utilize virtual addresses when processing the accessed data and instructions. A virtual address space for the data and instructions stored in system memory and used by a software process is divided into pages of a given size. The virtual pages are mapped to pages of physical memory. Mappings of virtual addresses to physical addresses keep track of where virtual pages are stored in the physical memory. These mappings are stored in a page table and this page table is stored in memory. A translation look-aside buffer (TLB), which is also a cache, stores a subset of the page table.

The TLB resides between a processor and a given level of the cache hierarchy. Alternatively, a TLB resides between two levels of the system memory hierarchy. In use, the TLB is accessed with a virtual address of a given memory access request to determine whether the TLB contains an associated physical address for a memory location holding requested data. Often software needs to update attributes of these virtual to physical mappings during the lifetime of an application. This update process may require that a prior mapping first be invalidated before a new one can be created. To invalidate a mapping, a TLB maintenance request is executed, which often requires the entire contents of the TLB to be searched to determine which index or group of indices pertain to a given mapping. Performing this invalidation can be time consuming as it often requires a linear search for a specific mapping or group of mappings. In some cases, the TLB may need to be searched multiple times to determine which TLB entries to invalidate, consuming power and preventing access to the TLB for translation requests. This process can be especially onerous for TLBs with a large number of indices or those with compact physical implementations that limit concurrent accesses.

In view of the above, efficient methods and mechanisms for improving the efficiency of TLB invalidation operations are desired.

SUMMARY

Systems, apparatuses, and methods for implementing translation lookaside buffer (TLB) striping to enable efficient invalidation operations are contemplated. In one embodiment, a TLB stores first attribute data in a striped manner across a plurality of arrays. The striped manner allows different indices to be searched simultaneously in response to receiving an invalidation request. In one embodiment, the invalidation request identifies a particular attribute of a group whose entries are to be invalidated. Rather than traverse each of the entries of a given array, the TLB control circuitry traverses a subset of entries of the given array while simultaneously traversing a subset of entries in one or more other arrays. The indices that are being traversed correspond to locations of the first attribute data which is striped across the separate arrays of the TLB.

In one embodiment, in response to receiving the invalidation request, the TLB generates a plurality of indices, wherein there is an offset between each index of the plurality of indices. Then, the TLB walks through the plurality of arrays at the plurality of indices by incrementing each index and simultaneously checking the value of the first attribute data in each entry of the plurality of arrays. If a match is found for the particular attribute, then the TLB invalidates the corresponding entry of the TLB. By implementing an invalidation request in this manner, the request can be serviced more quickly and with less power consumption. Also, a redundant copy of the first attribute data is not required to be stored in the TLB. By organizing the TLB storage in a striped fashion across multiple dense memory arrays, a linear search can be split up into multiple parallel searches. Each array is still providing a single lookup per cycle, yet by striping, multiple entries are actually accessed in a single cycle.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed. FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Figure 1:
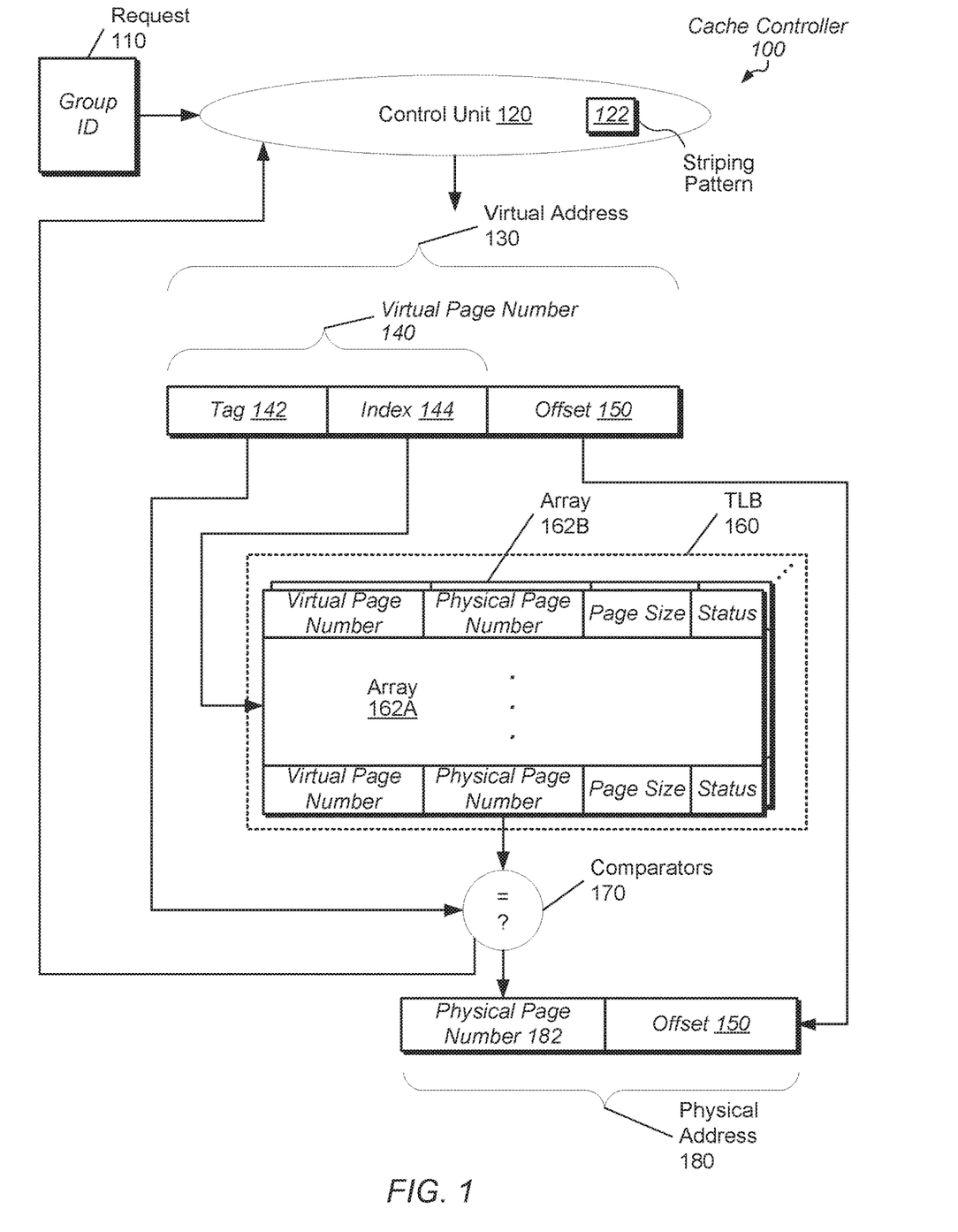
FIG. 1 is a generalized block diagram of one embodiment of a cache controller.

Referring to FIG. 1, a block diagram of one embodiment of a cache controller 100 is shown. As shown, cache controller 100 includes at least a translation lookaside buffer (TLB) 160 for storing virtual-to-physical address mappings and control unit 120. In one embodiment, control unit 120 includes physical circuitry arranged in an appropriate manner to perform the various functions described herein. In various embodiments, cache controller 100 receives virtual addresses from processing circuitry in a processor. In response to receiving a virtual address 130, cache controller 100 translates the virtual address 130 to a physical address 180 by accessing the TLB 160 and sends the physical address 180 to a data cache, which is not shown here for ease of illustration. In various embodiments, TLB 160 includes multiple separate banks, arrays, and other structures for storing mappings, group ID fields, metadata, and other data associated with the mappings. Additional details on the types of structures that may be employed will be provided throughout the remainder of this disclosure.

Virtual address 130 includes a virtual page number 140 and an offset 150. The offset 150 is used to specify a particular byte in a page. The virtual page number 140 is a virtual address portion used by processing circuitry in a processor when generating memory access requests. When the TLB 160 stores data using a set-associative cache organization, the virtual page number 140 is divided into a tag 142 and an index 144. However, when the TLB 160 stores data using a direct-mapped cache organization, the entire virtual page number 140 is used as an index. Data is stored in the TLB 160 in various manners. In many cases, the stored data is partitioned into cache lines. In some designs, each row of the TLB 160 stores data using a set-associative cache organization, whereas, in other designs, data is stored in a direct-mapped cache organization.

Each row in the TLB 160 stores a virtual page number of a virtual address and a corresponding physical page number of a physical address. In addition, a page size is stored when the TLB 160 is used to store multiple different page sizes at the same time. The status field stores various types of metadata such as a valid bit, a replacement state, and so forth.

One or more of the tag 142 and the index 144 of the virtual address 130 are used to search the TLB 160. When a set-associative cache organization is used, comparators 170 compare the tag portions of the virtual page numbers read from a particular set in the TLB 160 specified by the index 144. When a hit occurs, or there is a match between the virtual page number 140 and a virtual page number stored in an entry of the TLB 160, a physical page number is read out of the TLB entry and concatenated with the offset 150 to form the physical address 180. The physical address 180 is used to index into the data cache.

Additionally, the cache controller 100 processes maintenance requests such as invalidating multiple entries of the TLB 160. For example, a command, instruction, request or other sends an indication to the cache controller 100 to invalidate multiple mappings (i.e., entries) of the TLB 160. For example, a context switch or other change occurs to cause a portion of a page table stored in system memory to be removed or replaced. As shown, a request 110 includes a group identifier (ID) specifying a group to invalidate. In one embodiment, the group ID refers to a specific address space ID (ASID). In another embodiment, the group ID refers to a specific virtual machine ID (VMID). In a further embodiment, the group ID refers to a specific translation regime (e.g., guest, host). In a still further embodiment, the group ID is a combination of translation regime, VMID, and/or ASID. In other embodiments, the group ID refers to other types of groups or associations.

While control unit 120 itself is implemented by hardware, its operations may variously be controlled by hardware alone, by instructions executed by control unit 120 (e.g., in the form of firmware of software instructions), or by a combination of these. For example, control unit 120 may include one or more of combinatorial logic, finite state machines, or control and status registers along with an interface to retrieve and execute firmware or other software instructions for running particular subroutines when particular values are stored in a subset of the control and status registers.

When control unit 120 receives the request 110, control unit 120 generates a plurality of indices for accessing group IDs which are striped across a plurality of arrays 162A-B of TLB 160 according to striping pattern 122. In one embodiment, an array is defined as a static random access memory (RAM) storage structure, where each entry of the array is accessed using a unique numerical index value. The plurality of arrays 162A-B of TLB 160 are accessed in parallel at the plurality of indices generated by control unit 120. If any of the accessed entries includes the specific group ID identified by request 110, these entries will be invalidated. As used herein, the term "invalidate" is defined as marking a TLB entry as no longer available for use, thus effectively removing the entry from the structure. After accessing the entries of the plurality of arrays 162A-B in parallel, the indices are incremented (or decremented) and the arrays 162A-B are accessed again in a subsequent cycle. This process continues until all of the entries of TLB 160 have been searched to find any matching entries for the specific group ID. By accessing the arrays 162A-B of TLB 160 in parallel using a striping pattern, the invalidation request can be serviced more rapidly than is possible with the techniques used by prior art TLBs. It should be understood that arrays 162A-B are representative of any number of arrays although only two arrays 162A-B are shown in TLB 160.

In one embodiment, control unit 120 stores striping pattern 122 which defines the striping pattern used for storing group ID fields in the arrays 162A-B of TLB 160. In one embodiment, striping pattern 122 is stored in a lookup table (LUT). In this embodiment, a subset of bits from virtual address 130 are used to index into the LUT. An ID of the array is retrieved from the LUT for the given index, and the group ID for the virtual address 130 is stored in an entry in this particular array specified by the ID retrieved from the LUT. In other embodiments, striping pattern 122 is stored or represented using other types of data structures or storage elements.

For example, in another embodiment, striping pattern 122 merely identifies the subset of bits of the virtual address (VA) that are used to map to a particular TLB array. For example, in one embodiment with four arrays, if the subset of VA bits are "00", then the group ID is stored in array 0, if the subset of VA bits are "01", then the group ID is stored in array 1, if the subset of VA bits are "10", then the group ID is stored in array 2, or if the subset of VA bits are "11", then the group ID is stored in array 3. Other embodiments may use other mapping techniques to map the subset of VA bits to the appropriate TLB array.

Figure 2:
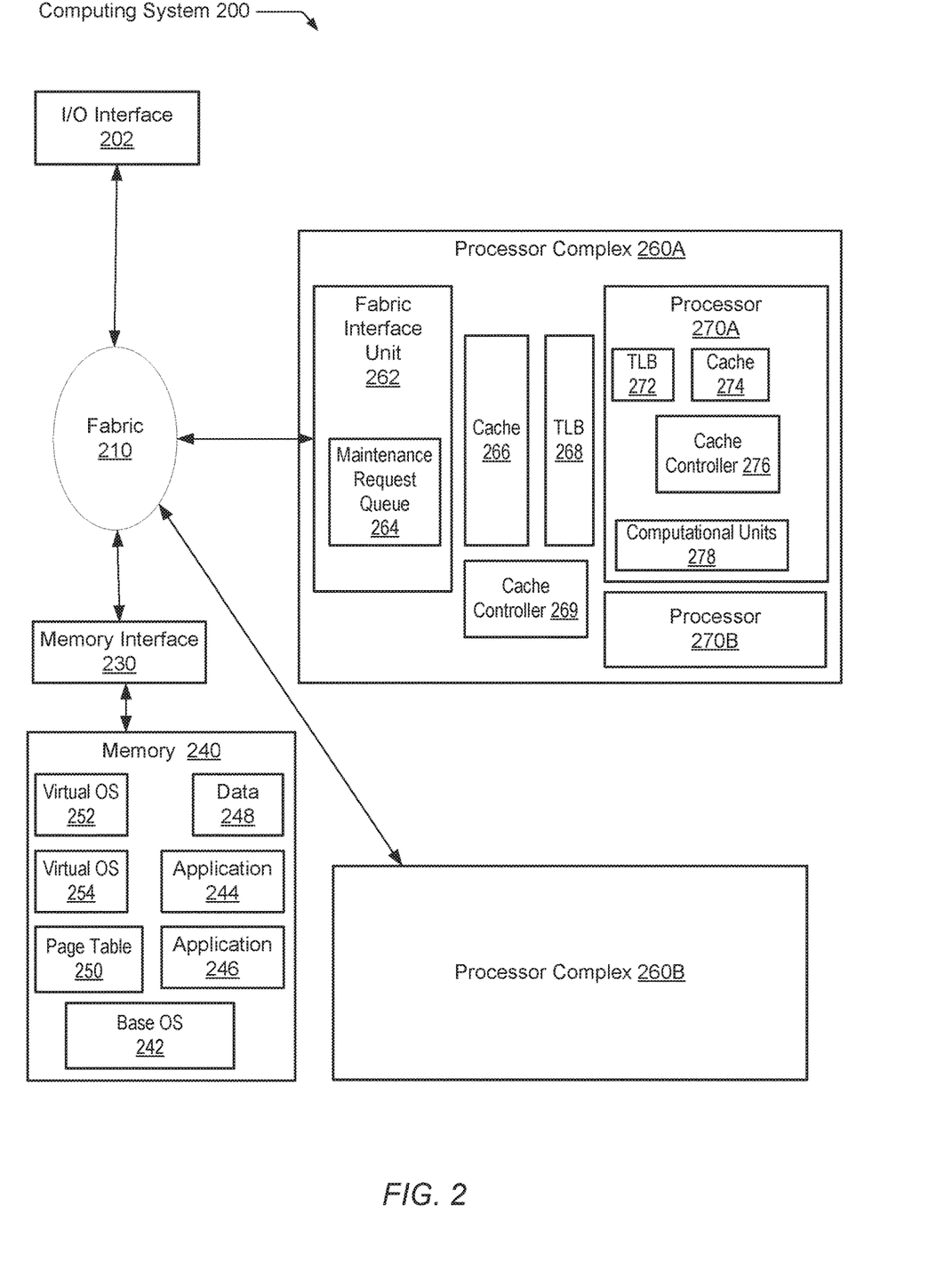
FIG. 2 is a generalized block diagram illustrating one embodiment of a computing system.

Referring to FIG. 2, a generalized block diagram of one embodiment of a computing system 200 is shown. As shown, a communication fabric 210 routes traffic between the input/output (I/O) interface 202, the memory interface 230, and the processor complexes 260A-260B. In various embodiments, the computing system 200 is a system on chip (SoC) that includes multiple types of integrated circuits on a single semiconductor die, each integrated circuit providing a separate functionality. In other embodiments, the multiple functional units are individual dies within a package, such as a multi-chip module (MCM). In yet other embodiments, the multiple functional units are individual dies or chips on a printed circuit board.

Clock sources, such as phase lock loops (PLLs), interrupt controllers, power managers, and so forth are not shown in FIG. 2 for ease of illustration. It is also noted that the number of components of the computing system 200 (and the number of subcomponents for those shown in FIG. 2, such as within each of the processor complexes 260A-260B) vary from embodiment to embodiment. The term "processor complex" is used to denote a configuration of one or more processor cores using local storage, such as a shared cache memory subsystem, and capable of processing a workload together.

In various embodiments, different types of traffic flow independently through the fabric 210. The independent flow is accomplished by allowing a single physical fabric bus to include a number of overlaying virtual channels, or dedicated source and destination buffers, each carrying a different type of traffic. Each channel is independently flow controlled with no dependence between transactions in different channels. The fabric 210 may also be packet-based, and may be hierarchical with bridges, cross bar, point-to-point, or other interconnects.

In some embodiments, the memory interface 230 uses at least one memory controller and at least one cache for the off-chip memory, such as synchronous DRAM (SDRAM). The memory interface 230 stores memory requests in request queues, uses any number of memory ports, and uses circuitry capable of interfacing to memory 240 using one or more of a variety of protocols used to interface with memory channels (not shown). In various embodiments, one or more of the memory interface 230, an interrupt controller (not shown), and the fabric 210 uses control circuitry to ensure coherence among the different processor complexes 260A-260B and peripheral devices.

As shown, memory 240 stores applications 244 and 246. In an example, a copy of at least a portion of application 244 is loaded into an instruction cache in one of the processors 270A-270B when application 244 is selected by the base operating system (OS) 242 for execution. Alternatively, one of the virtual (guest) OS's 252 and 254 selects application 244 for execution. Memory 240 stores a copy of the base OS 242 and copies of portions of base OS 242 are executed by one or more of the processors 270A-270B. Data 248 represents source data for applications in addition to result data and intermediate data generated during the execution of applications.

A virtual address space for the data stored in memory 240 and used by a software process is typically divided into pages of a prefixed size. The virtual pages are mapped to pages of physical memory. The mappings of virtual addresses to physical addresses where virtual pages are loaded in the physical memory are stored in page table 250. Each of translation look-aside buffers (TLBs) 268 and 272 stores a subset of page table 250.

In some embodiments, the components 262-278 of the processor complex 260A are similar to the components in the processor complex 260B. In other embodiments, the components in the processor complex 260A are substantially different from the components in processor complex 260B. As shown, processor complex 260A uses a fabric interface unit (FIU) 262 for providing memory access requests and responses to at least the processors 270A-270B. Processor complex 260A also supports a cache memory subsystem which includes at least cache 266. In some embodiments, the cache 266 is a shared off-die level two (L2) cache for the processors 270A-270B although an L2 cache is also possible and contemplated.

In some embodiments, the processors 270A-270B use a homogeneous architecture. For example, each of the processors 270A-270B is a general-purpose processor, such as a central processing unit (CPU), which utilizes circuitry for executing instructions according to a predefined general-purpose instruction set. Any of a variety of instruction set architectures (ISAs) is selected. In some embodiments, each core within processors 270A-270B supports the out-of-order execution of one or more threads of a software process and include a multi-stage pipeline. The processors 270A-270B may support the execution of a variety of operating systems.

In other embodiments, the processors 270A-270B use a heterogeneous architecture. In such embodiments, one or more of the processors 270A-270B is a highly parallel data architected processor, rather than a CPU. In some embodiments, these other processors of the processors 270A-270B use single instruction multiple data (SIMD) cores. Examples of SIMD cores are graphics processing units (GPUs), digital signal processing (DSP) cores, or otherwise.

In various embodiments, each one of the processors 270A-270B uses one or more cores and one or more levels of a cache memory subsystem. The processors 270A-270B use multiple one or more on-die levels (L1, L2, L3, and so forth) of caches for accessing data and instructions. If a requested block is not found in the on-die caches or in the off-die cache 266, then a read request for the missing block is generated and transmitted to the memory interface 230 via fabric 210. When one of applications 244-246 is selected for execution by processor complex 260A, a copy of the selected application is retrieved from memory 240 and stored in cache 266 of processor complex 260A. In various embodiments, each of processor complexes 260A-260B utilizes virtual addresses when retrieving instructions and data from caches 274 and 266 while processing applications 244-246.

Each of the processors 270A-270B is capable of generating maintenance requests for modifying a subset or all of the virtual-to-physical mappings in one or more of TLBs 268 and 272. The maintenance request is one of a request, a command, an instruction, or other. These maintenance requests are broadcast to the other processor. When processing complex 260A receives a maintenance request via fabric 210, in an embodiment, FIU 262 stores the received maintenance request in the maintenance request queue 264.

In an embodiment, FIU 262 performs pre-decoding of the received maintenance request to determine it is a maintenance request. Afterward, FIU 262 sends the maintenance request to processor 270A, in one example. One or more of the FIU 262, the cache controller 276, the cache controller 269, and a decode unit among the computation units 278 determines the type of the maintenance request. For example, different types of maintenance requests are used for invalidating entries in the instruction cache, for invalidating entries in a TLB and for synchronizing page table updates by ensuring no older virtual-to-physical mappings are present in computing system 200.

The received maintenance request is processed by sending it to one or more of the cache controller 276, the cache controller 269, and the computation units 278. The processing of the one or more maintenance requests may stall the processing of one or more of software applications 244-246. In one example, a fetch control unit and a memory management unit within computation units 278 becomes blocked due to accesses to the instruction cache, the instruction translation lookaside buffer (TLB) or the data TLB. Control circuitry in one or more one or more of the cache controller 276, the cache controller 269, and the computation units 278 is selected for processing a maintenance request indicating to invalidate multiple entries of TLB 268 and/or TLB 272. After the entries are invalidated, one or more of software applications 244-246 continue processing on computation units 278.

Figure 3:
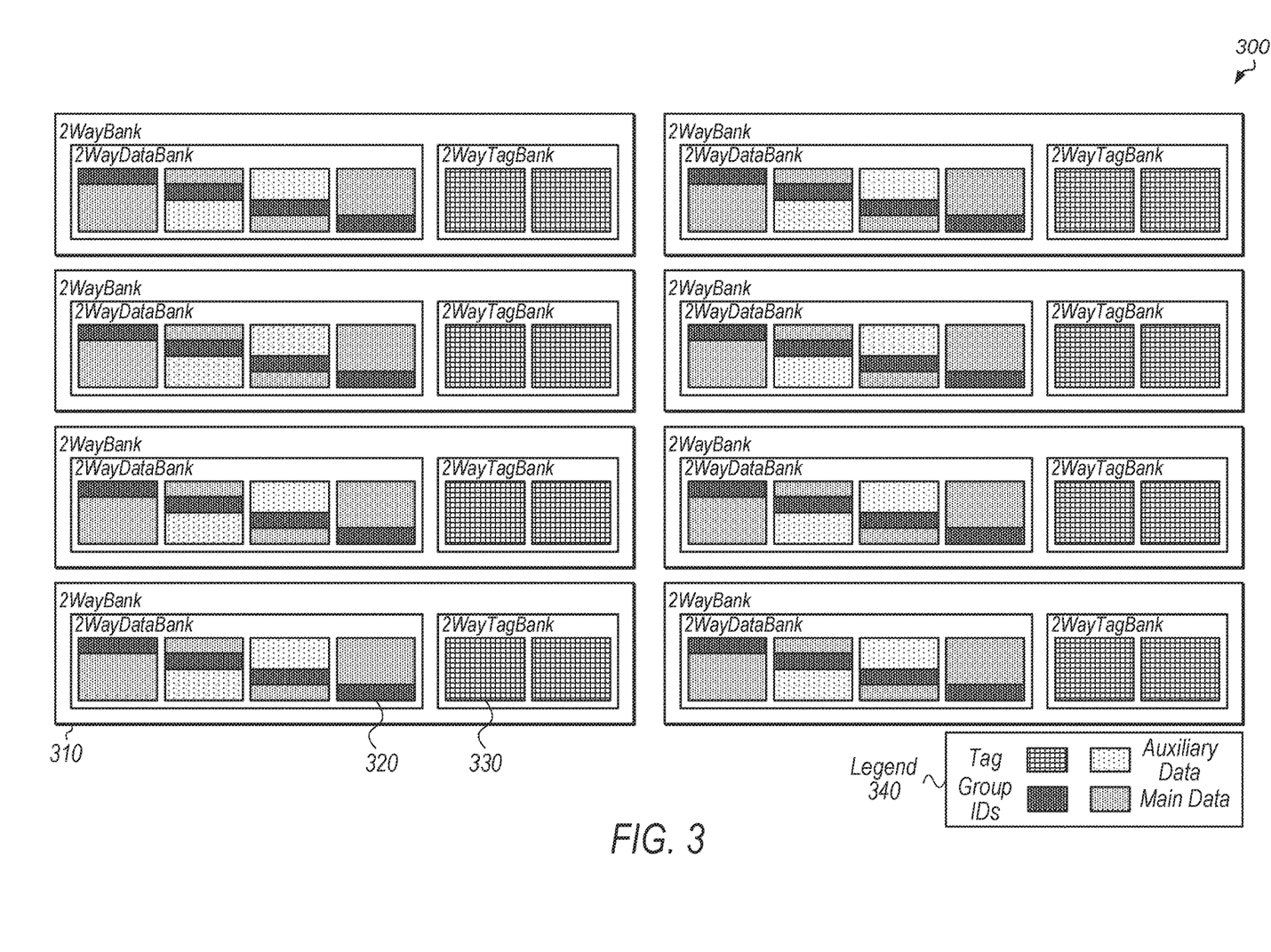
FIG. 3 is a block diagram of one embodiment of a TLB with striped group ID patterns.

Referring now to FIG. 3, a block diagram of one embodiment of a TLB 300 with striped group ID patterns is shown.

In one embodiment, the group ID fields stored in TLB 300 are striped across the arrays so as to reduce the amount of time required for completing a group ID invalidation request. The example of TLB 300 illustrates an example of a 16-way set associative TLB. Each bank includes tags and data for two ways, with TLB 300 including eight banks. In other embodiments, a TLB may have other numbers of ways in a set associative structure. For these other embodiments, the group ID fields may be striped across arrays in a similar pattern to that shown for TLB 300.

An example TLB bank 310 is shown on the bottom-left of FIG. 3. TLB bank 310 includes four data arrays and two tag arrays. In this example, the two-way data bank is designated as "Data" because the bank is mostly comprised of data. Also, the two-way tag bank is designated as "Tag" because the bank is comprised of the virtual page number portion of the tag. However, it should be understood that the designation of what constitutes data and what constitutes the tag may vary from embodiment to embodiment. In one embodiment, the translation regime, VMID, ASID, and virtual page number are considered part of the tag. In this embodiment, the physical page number, memory type, permissions, attributes, and so on are considered part of the data. In other embodiments, the designation of what constitutes data and what constitutes the tag may vary from the above characterization.

For the four data arrays, the group ID fields are stored in a striped pattern with different indices in each data array storing the group ID fields. Group ID fields are the dark shaded portions of each array, with group ID fields 320 shown for the shaded pattern of the bottom portion of the fourth data array. Architecturally, the group ID would normally be considered as part of the tag, but in this embodiment, the group ID is striped with information that would normally be considered data. However, in other embodiments, other ways of striping the group ID with other portions of data and/or the tag are possible and are contemplated. The left-most tag array 330 is labeled and shown with the checkered pattern in the two-way tag bank of TLB bank 310. Legend 340 provides an indication of the different types of shading used for the data layout in TLB 300 for the tag data, auxiliary data, group IDs, and main data.

The striping pattern of group ID fields allows the four separate arrays to be searched in parallel when carrying out an invalidation request for a given group ID. For example, the control circuitry (not shown) of the TLB 300 will generate four separate indices in response to receiving an invalidation request for a specific group ID. These indices may be 0, 64, 128, and 192 in one embodiment. In other embodiments, with other numbers of entries per array, the initial values of the indices will differ from the above example. For the above group of indices (0, 64, 128, and 192), the control circuitry checks the value of the group ID field at each of these entries. In some cases, there are multiple group ID fields stored per entry, and the control circuitry checks the values of all group ID fields per entry in these cases.

If the group ID stored in the group ID field matches the specific group ID of the invalidation request, then the control circuitry invalidates the corresponding entry of TLB 300. Otherwise, if the group ID of the array does not match the specific group ID of the invalidation request, the entry remains valid. Depending on the embodiment and on the type of the TLB invalidate request, a match could require one or more values specified in the request to be equal to values in one or more of the regime, VMID, ASID, virtual page number, or other fields of the entry.

Continuing with the above example, the four entries of the four separate arrays are checked simultaneously. Then, all four indices are incremented from 0, 64, 128, and 192 to 1, 65, 129, and 193, respectively. The group ID fields of these entries are checked, in parallel, and any matching entries are invalidated. This process continues with the indices being incremented for subsequent cycles until the four indices are 63, 127, 191, and 255. At that point, all of the entries of the 2 way bank will have been checked. But performing the invalidation request process in this manner, the request can be serviced much faster than was previously possible with other index-read mechanisms.

In another embodiment, the four indices generated by the control circuitry can start at 63, 127, 191, and 255. Then, after checking these entries, the indices are decremented to 62, 126, 190, and 254, respectively. The entries of the corresponding arrays at these indices are checked, and then the process continues by decrementing the indices at each step until the indices reach 0, 64, 128, and 192, respectively. It is noted that other ways of stepping through the arrays to check the group ID fields of these arrays in parallel are possible and are contemplated.

Figure 4:
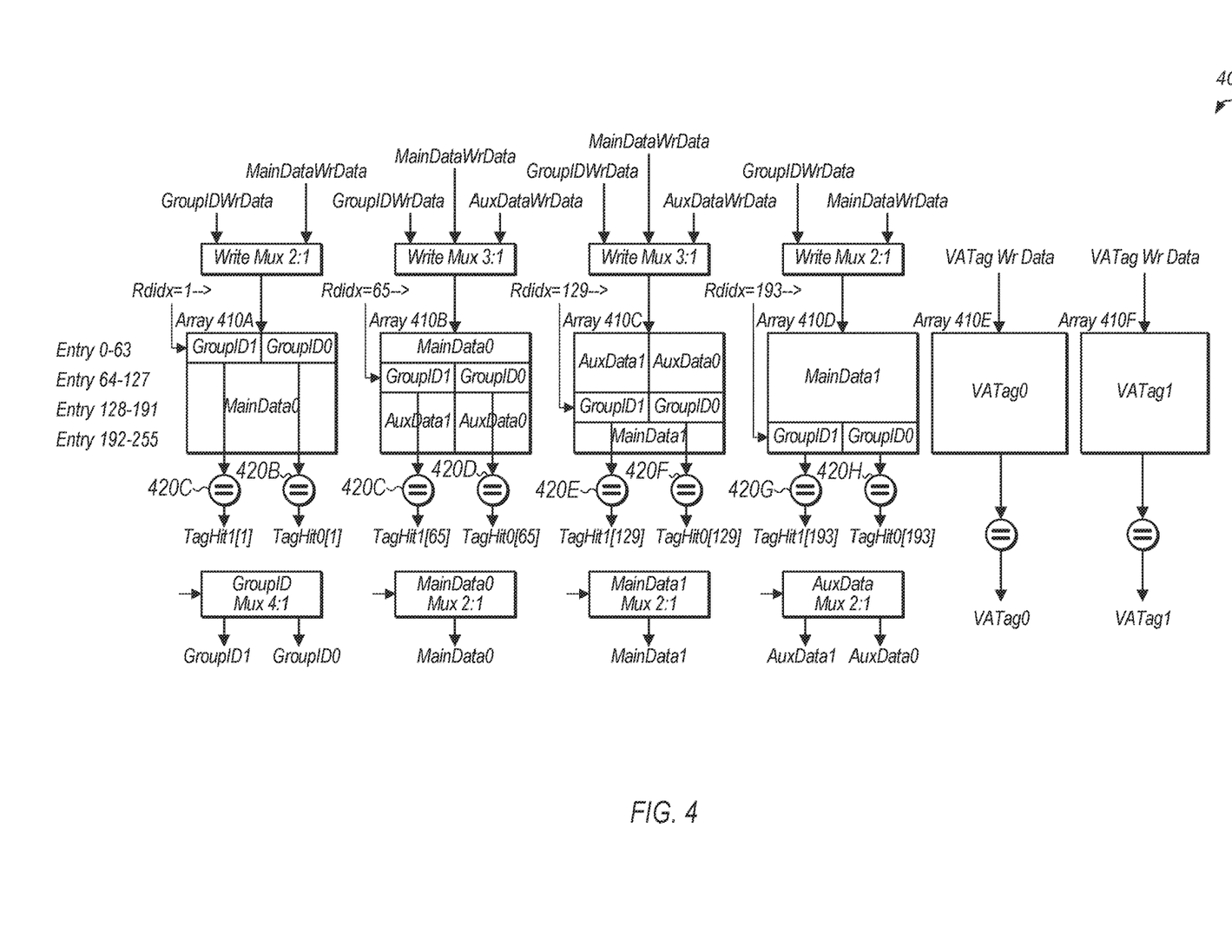
FIG. 4 is a block diagram of one embodiment of fulfilling a TLB invalidation request in parallel on a plurality of arrays.

Turning now to FIG. 4, a block diagram of one embodiment of fulfilling a TLB invalidation request in parallel on a plurality of arrays is shown. In one embodiment, a single TLB bank 400 is organized as shown in FIG. 4 with arrays 410A-D including group IDs stored in a striping pattern and arrays 410E-F storing virtual address tags for two separate ways. Arrays 410A-D also store main data for ways 0-1 and auxiliary data for ways 0-1, with the auxiliary data including various metadata fields associated with the corresponding TLB entries. While bank 400 is shown as a two-way, set-associative structure, it should be understood that this is merely indicative of one particular embodiment. In other embodiments, other set-associative structures with other numbers of ways may be employed, or a direct mapped structure may be employed. These other embodiments can use the techniques disclosed herein with appropriate modifications made to the circuitry and structures to account for the specific type of topology used by the TLB.

The arrangement of group ID fields in the different arrays 410A-D allows for the parallel searching of arrays 410A-D when implementing a search for an invalidation request targeting a specific group ID. In one embodiment, the group ID refers to a specific ASID. In another embodiment, the group ID refers to a specific VMID. In other embodiments, the group ID refers to other types of groups or associations. An example of a parallel search of arrays 410A-D is shown in FIG. 4. In a given cycle, the read index is set to 1 for array 410A, the read index is set to 65 for array 410A, the read index is set to 129 for array 410C, and the read index is set to 193 for array 410D. The group ID fields corresponding to ways 0 and 1 are retrieved from arrays 410A-D in a single cycle and provided to comparators 420A-H. If a group ID field matches with the group ID specified by the invalidation request, the corresponding TLB entry is invalidated. An invalidated TLB entry can then be reclaimed at a later point in time.

After searching entries in arrays 410A-D corresponding to indices 1, 65, 129, and 193, the indices are incremented and then the adjacent entries at indices 2, 66, 130, and 194 are searched in the next cycle. This process can continue until all entries have been searched. This process achieves a 4× speed-up in the searching of TLB entries for a given invalidation request as compared to a traditional approach. In the traditional approach, a single array would store all of the group IDs for TLB bank 400, and this would allow only a single entry to be retrieved per cycle. Thus, 256 cycles would be needed to search through all entries. With the approach illustrated in FIG. 4, only 64 cycles are needed to search through all of the entries. It is noted that the example of having 256 entries per array is used solely for illustrative purposes. In other embodiments, each array may have other numbers of entries. Also, in other embodiments, a TLB bank may have other numbers of arrays than four.

Figure 5:
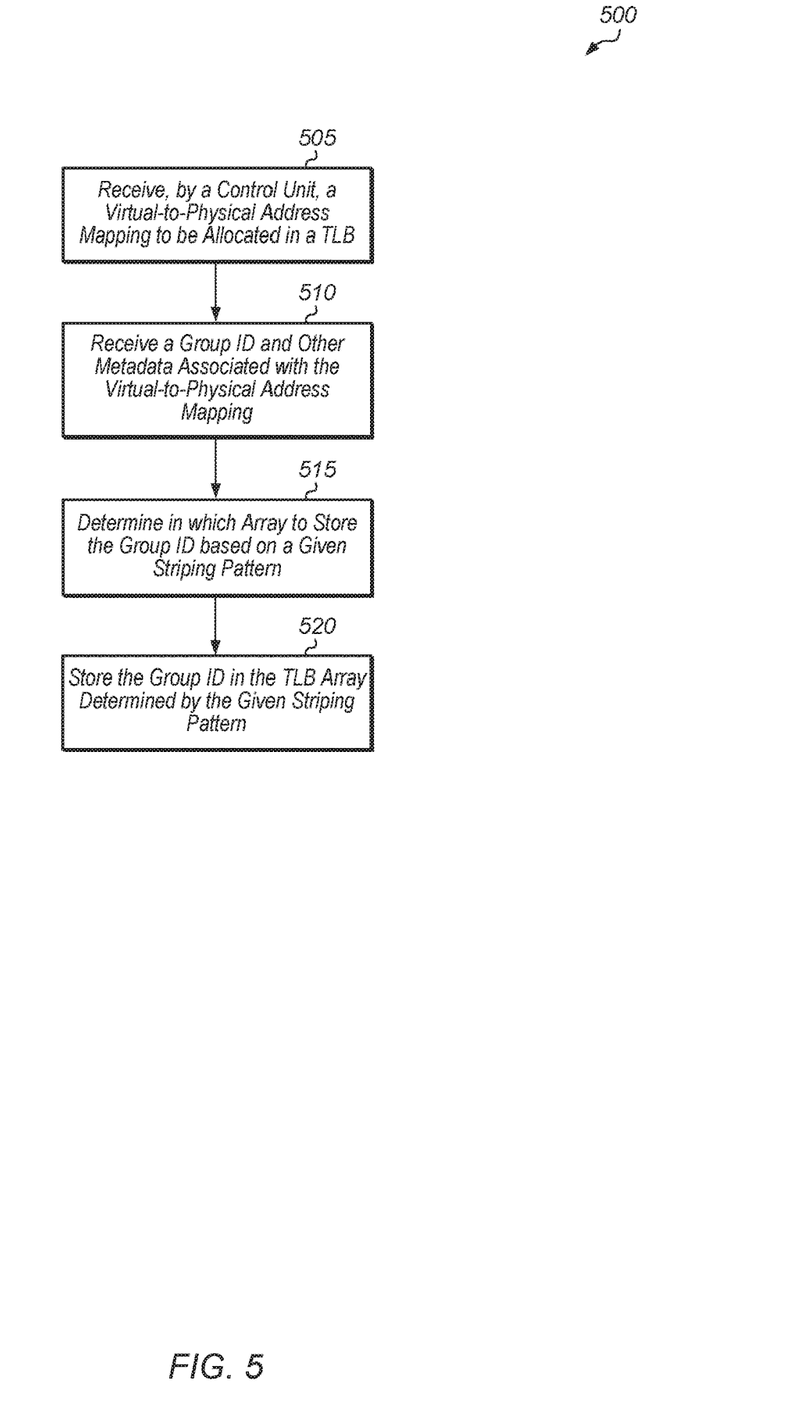
FIG. 5 is a flow diagram of one embodiment of a method for implementing translation lookaside buffer striping to enable efficient invalidation operations.

Referring now to FIG. 5, a generalized flow diagram of one embodiment of a method 500 for implementing translation lookaside buffer striping to enable efficient invalidation operations is shown. For purposes of discussion, the steps in this embodiment (as well as for FIGS. 6-7) are shown in sequential order. However, in other embodiments some steps may occur in a different order than shown, some steps may be performed concurrently, some steps may be combined with other steps, and some steps may be absent.

A control unit (control unit 120 of FIG. 1) receives a virtual-to-physical address mapping to be allocated in a TLB (block 505). The control unit also receives a group ID and other metadata associated with the virtual-to-physical address mapping (block 510). The control unit determines in which array to store the group ID based on a given striping pattern (block 515). In one embodiment, the control unit determines in which array to store the group ID by performing a lookup of a striping pattern LUT using a subset of bits of the virtual address of the mapping. For example, in this embodiment, the control unit retrieves an ID of a TLB array from a matching entry of the striping pattern LUT. For example, in one embodiment, the striping pattern LUT is a four-entry LUT, and two bits from the virtual address are used to identify a matching entry in the four-entry LUT. In other embodiments, the control unit uses other techniques for determining in which array to store the group ID.

Next, the control unit stores the group ID in the TLB array determined by the given striping pattern (block 520). For set-associative TLBs, the control unit may also store the group ID in a particular section of the matching entry that corresponds to the specific TLB way where the mapping is stored. After block 520, method 500 ends. It is noted that other fields associated with the virtual-to-physical address mapping can also implement a similar method 500 to identify where in the TLB these other fields should be stored to conform to the chosen striping pattern scheme.

Figure 6:
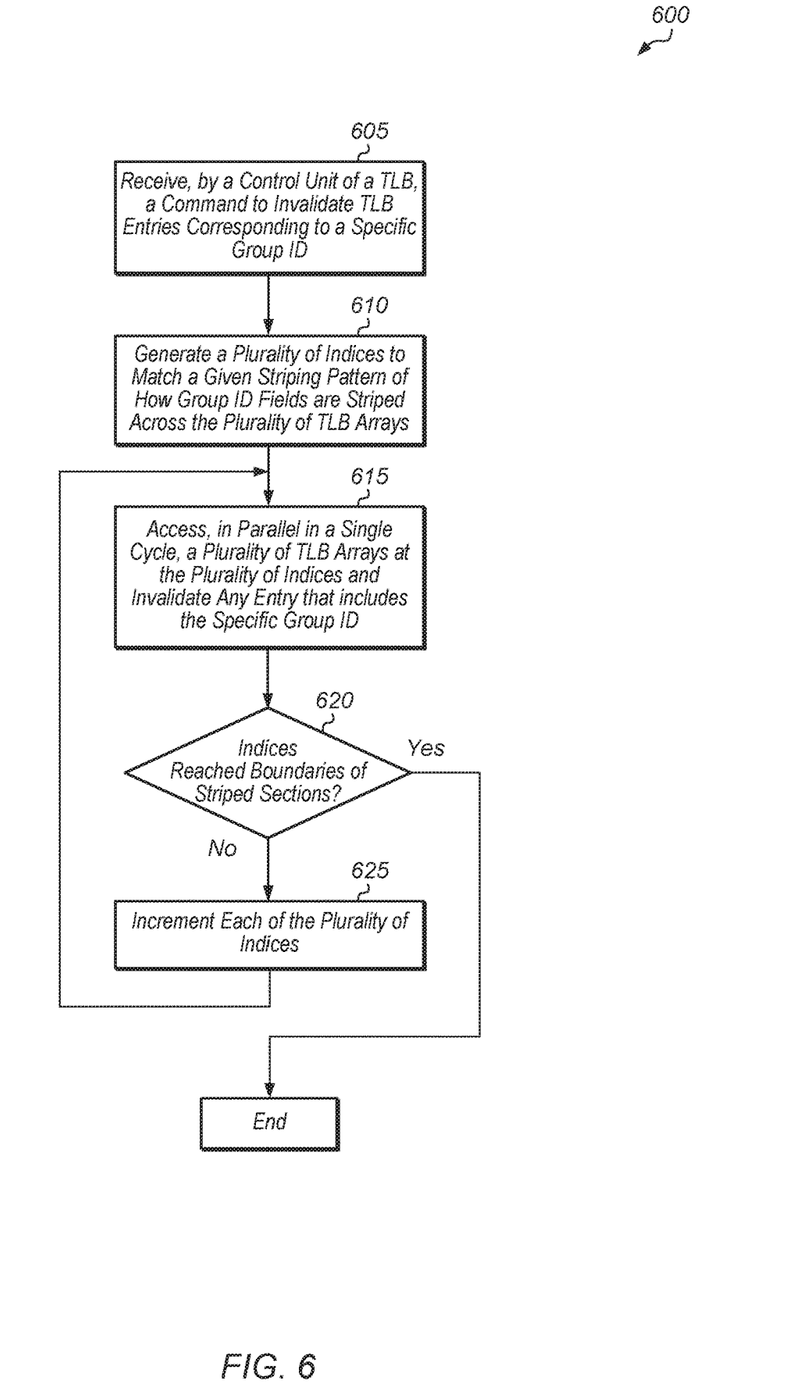
FIG. 6 is a flow diagram of one embodiment of a method for implementing translation lookaside buffer striping to enable efficient invalidation operations.

Turning now to FIG. 6, one embodiment of a method 600 for implementing translation lookaside buffer striping to enable efficient invalidation operations is shown. A control unit (control unit 120 of FIG. 1) of a TLB receives a command to invalidate TLB entries corresponding to a specific group ID (block 605). Depending on the embodiment, the command can be an instruction, maintenance request, or other type of indication. In one embodiment, the group ID is a tuple of (regime, VMID, ASID), and the invalidation match requirements against this group ID vary depending on the type of TLB invalidate command. The TLB invalidate command may need to invalidate any entry with a matching regime, and/or a matching VMID, and/or a matching ASID, or with no matching requirement.

Next, the control unit generates a plurality of indices based at least in part on receiving the command, wherein the plurality of indices are generated to match a given striping pattern of how group ID fields are striped across the plurality of TLB arrays (block 610). Next, the control unit accesses, in parallel in a single cycle, a plurality of TLB arrays at the plurality of indices and invalidates any entry that includes the specific group ID (block 615). If the plurality of indices have reached the boundaries of their corresponding striped sections (conditional block 620, "yes" leg), then method 600 ends. Otherwise, if the plurality of indices have not reached the boundaries of their corresponding striped sections (conditional block 620, "no" leg), then the control unit increments each of the plurality of indices (block 625). In other words, the control unit adjusts the plurality of indices to move to adjacent entries of corresponding TLB arrays in block 625. After block 625, method 600 returns to block 615.

Figure 7:
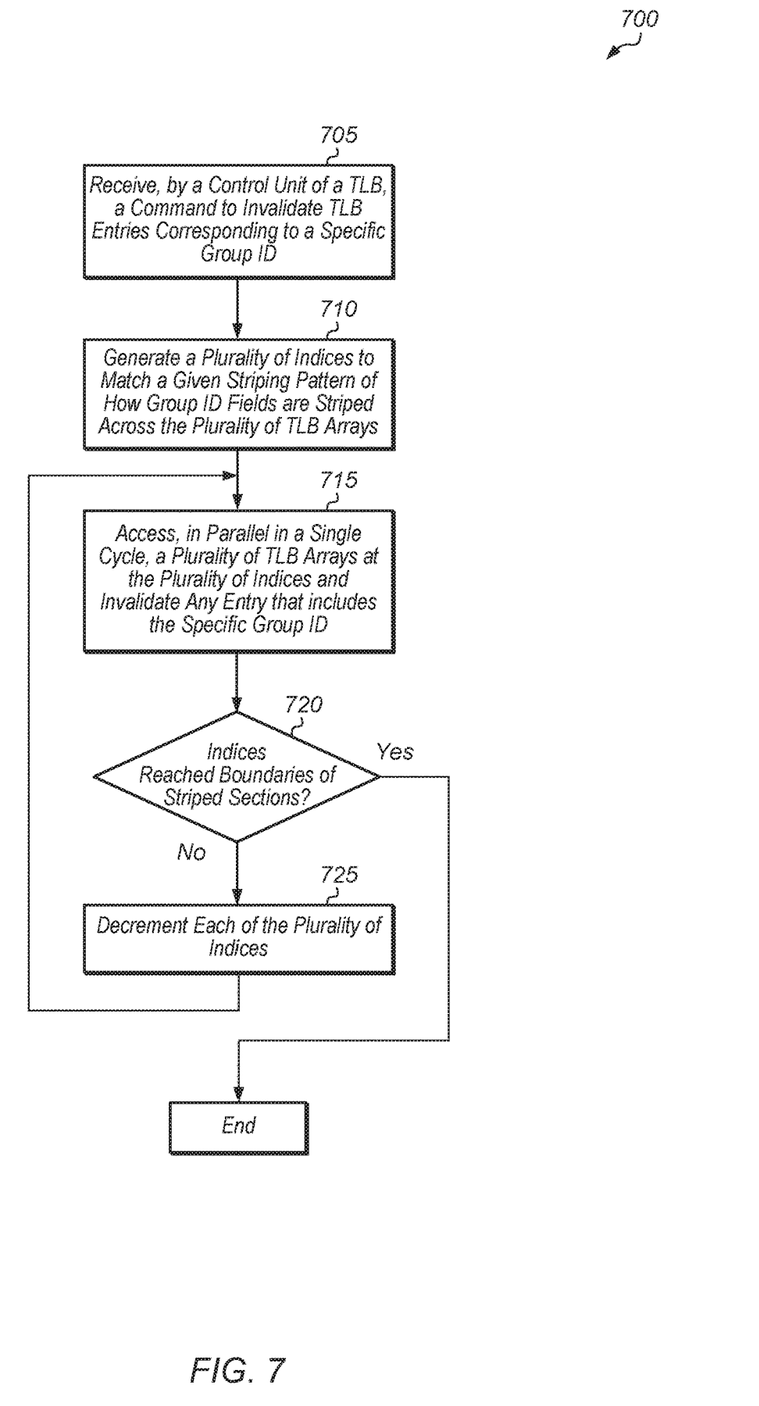
FIG. 7 is a flow diagram of one embodiment of a method for implementing translation lookaside buffer striping to enable efficient invalidation operations.

Referring now to FIG. 7, one embodiment of a method 700 for implementing translation lookaside buffer striping to enable efficient invalidation operations is shown. A control unit (control unit 120 of FIG. 1) of a TLB receives a command to invalidate TLB entries corresponding to a specific group ID (block 705). The control unit generates a plurality of indices based at least in part on receiving the command, wherein the plurality of indices are generated to match a given striping pattern of how group ID fields are striped across the plurality of TLB arrays (block 710). Next, the control unit accesses, in parallel in a single cycle, a plurality of TLB arrays at the plurality of indices and invalidates any entry that includes the specific group ID (block 715). If the plurality of indices have reached the boundaries of their corresponding striped sections (conditional block 720, "yes" leg), then method 700 ends. Otherwise, if the plurality of indices have not reached the boundaries of their corresponding striped sections (conditional block 720, "no" leg), then the control unit decrements each of the plurality of indices (block 725). After block 725, method 700 returns to block 715.

Figure 8:
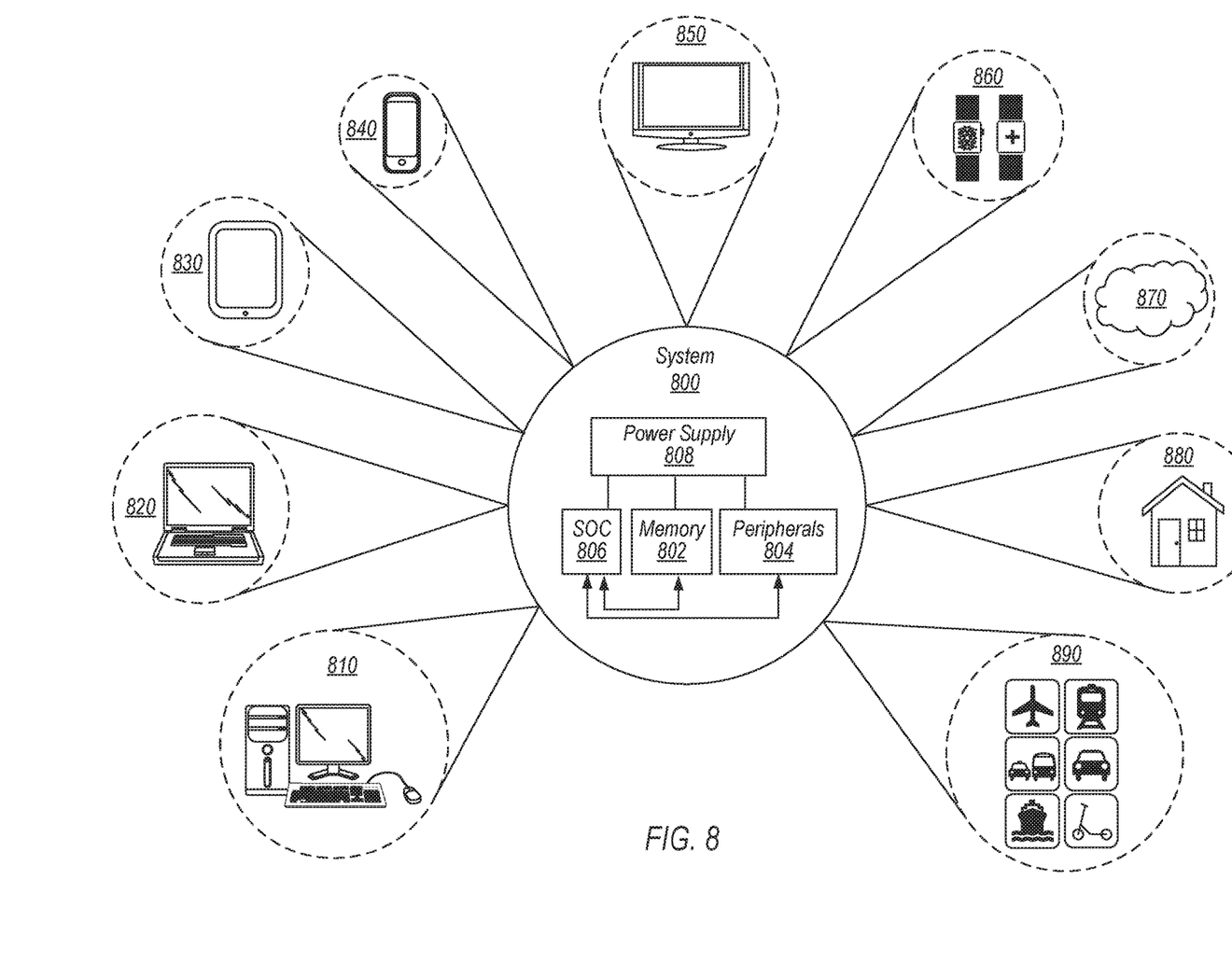
FIG. 8 is a block diagram of one embodiment of a system.

Turning now to FIG. 8, a block diagram of one embodiment of a system 800 is shown that may incorporate and/or otherwise utilize the methods and mechanisms described herein. In the illustrated embodiment, the system 800 includes at least one instance of a system on chip (SoC) 806 which may include multiple types of processing units, such as a central processing unit (CPU), a graphics processing unit (GPU), or otherwise, a communication fabric, and interfaces to memories and input/output devices. In some embodiments, one or more processors in SoC 806 includes at least one TLB. In some embodiments, SoC 806 includes components similar to cache controller 100 (of FIG. 1) and computing system 200 (of FIG. 2). In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory 802 may be included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 804 include any desired circuitry, depending on the type of system 800. For example, in one embodiment, peripherals 804 includes devices for various types of wireless communication, such as wifi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home 880 other than those previously mentioned. For example, appliances within the home 880 may monitor and detect conditions that warrant attention. For example, various devices within the home 880 (e.g., a refrigerator, a cooling system, etc.) may monitor the status of the device and provide an alert to the homeowner (or, for example, a repair facility) should a particular event be detected. Alternatively, a thermostat may monitor the temperature in the home 880 and may automate adjustments to a heating/cooling system based on a history of responses to various conditions by the homeowner. Also illustrated in FIG. 8 is the application of system 800 to various modes of transportation 890. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These and many other embodiments are possible and are contemplated. It is noted that the devices and applications illustrated in FIG. 8 are illustrative only and are not intended to be limiting. Other devices are possible and are contemplated.

In various embodiments, program instructions of a software application may be used to implement the methods and/or mechanisms previously described. The program instructions describe the behavior of hardware in a high-level programming language, such as C. Alternatively, a hardware design language (HDL) may be used, such as Verilog. The program instructions are stored on a non-transitory computer readable storage medium. Numerous types of storage media are available. The storage medium is accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
    a translation lookaside buffer (TLB) comprising a plurality of TLB arrays for storing group identifiers (IDs) corresponding to a plurality of virtual-address-to-physical-address mapping entries; and
    a control unit configured to:
        receive a command to invalidate TLB entries corresponding to a specified group ID;
        generate a plurality of indices based at least in part on receiving the command, wherein the plurality of indices are generated to match a given striping pattern of how group ID fields are striped across the plurality of TLB arrays;
        access, in parallel in a first cycle, the plurality of TLB arrays at the plurality of indices and invalidate an entry if the entry includes the specified group ID;
        adjust the plurality of indices to move to adjacent entries of corresponding TLB arrays of the plurality of TLB arrays in a second cycle to determine if any of the adjacent entries include the specified group ID; and
        continue adjusting the plurality of indices and accessing, in parallel, the plurality of TLB arrays in subsequent cycles and invalidating entries matching the specified group ID.

2. The apparatus as recited in claim 1, wherein:
    a first subset of entries, corresponding to a subset of indices, of a given TLB array of the plurality of TLB arrays includes a group ID field; and
    a second subset of entries of the given TLB array does not include the group ID field.

3. The apparatus as recited in claim 1, wherein a subset of entries of two or more of the plurality of TLB arrays store a group ID field, and wherein a location of the subset of entries of a given TLB array is different from locations of subsets of entries of other TLB arrays of the plurality of TLB arrays.

4. The apparatus as recited in claim 1, wherein the specified group ID is based on a given address space identifier (ASID), translation regime, or virtual machine identifier (VMID).

5. The apparatus as recited in claim 1, wherein the control unit is configured to increment the plurality of indices in lockstep to move to the adjacent entries of the corresponding TLB arrays, and wherein a given stride between a first index and a second index of the plurality of indices remains unchanged after the plurality of indices are incremented.

6. The apparatus as recited in claim 1, wherein the control unit is configured to access a striping pattern lookup table (LUT) to determine in which array to store a given group ID based on a given striping pattern.

7. The apparatus as recited in claim 1, wherein virtual-to-physical address mappings are stored in other arrays separate from the plurality of TLB arrays.

8. A method comprising:
    receiving, by a control unit in a translation lookaside buffer (TLB) comprising a plurality of TLB arrays for storing group identifiers (IDs) corresponding to a plurality of virtual-address-to-physical-address mapping entries, a command to invalidate TLB entries corresponding to a specified group identifier (ID);
    generating a plurality of indices based at least in part on receiving the command, wherein the plurality of indices are generated to match a given striping pattern of how group ID fields are striped across the plurality of TLB arrays;
    accessing, in parallel in a first cycle, a plurality of TLB arrays at the plurality of indices and invalidate an entry if the entry includes the specified group ID;
    adjusting the plurality of indices to move to adjacent entries of corresponding TLB arrays of the plurality of TLB arrays in a second cycle to determine if any of the adjacent entries include the specified group ID; and
    continuing adjusting the plurality of indices and accessing, in parallel, the plurality of TLB arrays in subsequent cycles and invalidating entries matching the specified group ID.

9. The method as recited in claim 8, wherein:
    a first subset of entries, corresponding to a subset of indices, of a given TLB array of the plurality of TLB arrays includes a group ID field; and
    a second subset of entries of the given TLB array does not include the group ID field.

10. The method as recited in claim 8, wherein a subset of entries of two or more of the plurality of TLB arrays store a group ID field, and wherein a location of the subset of entries of a given TLB array is different from locations of subset of entries of other TLB arrays of the plurality of TLB arrays.

11. The method as recited in claim 8, wherein the specified group ID is based on a given address space identifier (ASID), translation regime, or virtual machine identifier (VMID).

12. The method as recited in claim 8, further comprising incrementing the plurality of indices in lockstep to move to the adjacent entries of the corresponding TLB arrays, wherein a given stride between a first index and a second index of the plurality of indices remains unchanged after the plurality of indices are incremented.

13. The method as recited in claim 8, further comprising accessing a striping pattern lookup table (LUT) to determine in which array to store a given group ID based on a given striping pattern.

14. The method as recited in claim 8, wherein virtual-to-physical address mappings are stored in other arrays separate from the plurality of TLB arrays.

15. A system comprising:
    a translation lookaside buffer (TLB) comprising a plurality of TLB arrays for storing group identifiers (IDs) corresponding to a plurality of virtual-address-to-physical-address mapping entries; and
    a control unit configured to:
        access, in parallel in a first cycle, the plurality of TLB arrays at a plurality of indices and invalidate an entry if the entry includes a specified group ID, wherein the plurality of indices are generated to match a given striping pattern of how group ID fields are striped across the plurality of TLB arrays;

adjust the plurality of indices to move to adjacent entries of corresponding TLB arrays of the plurality of TLB arrays in a second cycle to determine if any of the adjacent entries include the specified group ID; and continue adjusting the plurality of indices and accessing, in parallel, the plurality of TLB arrays in subsequent cycles and invalidating entries matching the specified group ID.

16. The system as recited in claim 15, wherein:

a first subset of entries, corresponding to a subset of indices, of a given TLB array of the plurality of TLB arrays includes a group ID field; and a second subset of entries of the given TLB array does not include the group ID field.

17. The system as recited in claim 15, wherein a subset of entries of two or more of the plurality of TLB arrays store a group ID field, and wherein a location of the subset of entries of a given TLB array is different from locations of subset of entries of other TLB arrays of the plurality of TLB arrays.

18. The system as recited in claim 15, wherein the specified group ID is based on a given address space identifier (ASID), translation regime, or virtual machine identifier (VMID).

19. The system as recited in claim 15, wherein the control unit is configured to increment the plurality of indices in lockstep to move to the adjacent entries of the corresponding TLB arrays, and wherein a given stride between a first index and a second index of the plurality of indices remains unchanged after the plurality of indices are incremented.

20. The system as recited in claim 15, wherein the control unit is configured to access a striping pattern lookup table (LUT) to determine in which array to store a given group ID based on a given striping pattern.

* * * * *

UNITED STATES PATENT AND TRADEMARK OFFICE
CERTIFICATE OF CORRECTION

PATENT NO. : 11,422,946 B2
APPLICATION NO. : 17/008457
DATED : August 23, 2022
INVENTOR(S) : Pape et al.

It is certified that error appears in the above-identified patent and that said Letters Patent is hereby corrected as shown below:

In the Specification

Column 11, Line 59, delete "one or more one or more" and insert -- one or more --.

Signed and Sealed this
Eighteenth Day of October, 2022

Katherine Kelly Vidal
*Director of the United States Patent and Trademark Office*